(12) United States Patent
Goth et al.

(10) Patent No.: US 7,643,620 B1
(45) Date of Patent: Jan. 5, 2010

(54) SYSTEM AND METHOD FOR NOTIFICATION OF AN EVENT

(75) Inventors: Jason Goth, Dallas, TX (US); Feridoon Amini, Irving, TX (US); Nathan A. Bennette, Frisco, TX (US); Mark Allen, Plano, TX (US); Carline Smith, Roanoke, TX (US); Laura Therminy, Fort Worth, TX (US)

(73) Assignee: American Airlines, Inc., Fort Worth, TX (US)

(*) Notice: Subject to any disclaimer, the term of this patent is extended or adjusted under 35 U.S.C. 154(b) by 659 days.

(21) Appl. No.: 11/167,799

(22) Filed: Jun. 27, 2005

(51) Int. Cl.
*H04M 1/64* (2006.01)

(52) U.S. Cl. ............ 379/88.12; 379/88.22; 379/142.01; 379/214.01; 455/412.2

(58) Field of Classification Search ............ 379/88.12, 379/88.25, 88.17, 211.01, 88.22, 142.01, 379/214.01; 340/7.29; 455/567, 412.2; 707/104.1; 726/22

See application file for complete search history.

(56) References Cited

U.S. PATENT DOCUMENTS

| | | | | |
|---|---|---|---|---|
| 6,092,102 A | * | 7/2000 | Wagner | 340/7.29 |
| 6,459,913 B2 | * | 10/2002 | Cloutier | 455/567 |
| 6,496,568 B1 | * | 12/2002 | Nelson | 379/88.12 |
| 6,795,536 B1 | * | 9/2004 | Ronca | 379/88.25 |
| 6,990,591 B1 | * | 1/2006 | Pearson | 726/22 |
| 7,054,419 B2 | * | 5/2006 | Culliss | 379/88.22 |
| 7,167,701 B1 | * | 1/2007 | Jordan, Jr. | 455/412.2 |
| 7,180,991 B2 | * | 2/2007 | Dhara et al. | 379/142.01 |
| 2004/0199411 A1 | | 10/2004 | Bertram et al. | |
| 2004/0204968 A1 | | 10/2004 | Bertram et al. | |
| 2005/0169443 A1 | * | 8/2005 | Rosenthal | 379/88.17 |
| 2006/0190485 A1 | * | 8/2006 | Adams et al. | 707/104.1 |
| 2007/0071213 A1 | * | 3/2007 | Claudatos et al. | 379/211.01 |

* cited by examiner

*Primary Examiner*—Gerald Gauthier
(74) *Attorney, Agent, or Firm*—Haynes and Boone, LLP

(57) ABSTRACT

A system and method for notifying a notification recipient of an event status change and allowing the notification recipient to request action is disclosed. An event occurs. A message relating to the event applicable to an end-user is created. A communication link between an outbound module and a device associated with the end-user is established. The message is delivered to the end-user device. The communication link is transferred from the outbound module to an inbound module. A response is received from the end-user device at the inbound module.

14 Claims, 4 Drawing Sheets

SYSTEM AND METHOD FOR NOTIFICATION OF AN EVENT

BACKGROUND

In many industries, including the travel industry, vendors try to find ways to attract new customers or clients and increase loyalty from their customer base. Regardless of the type of interaction with the vendor, such as for example, ordering goods, making reservations, or making appointments, entities engaging in the interaction want to be informed about the status, particularly if there are changes to the interaction. For example, an entity may want to be notified of an appointment cancellation or alteration, of the delay in delivery of product, or a required change in an underlying reservation activity. In addition, such entity may want to alter the interaction as a result of the information.

DETAILED DESCRIPTION

Figure 1:
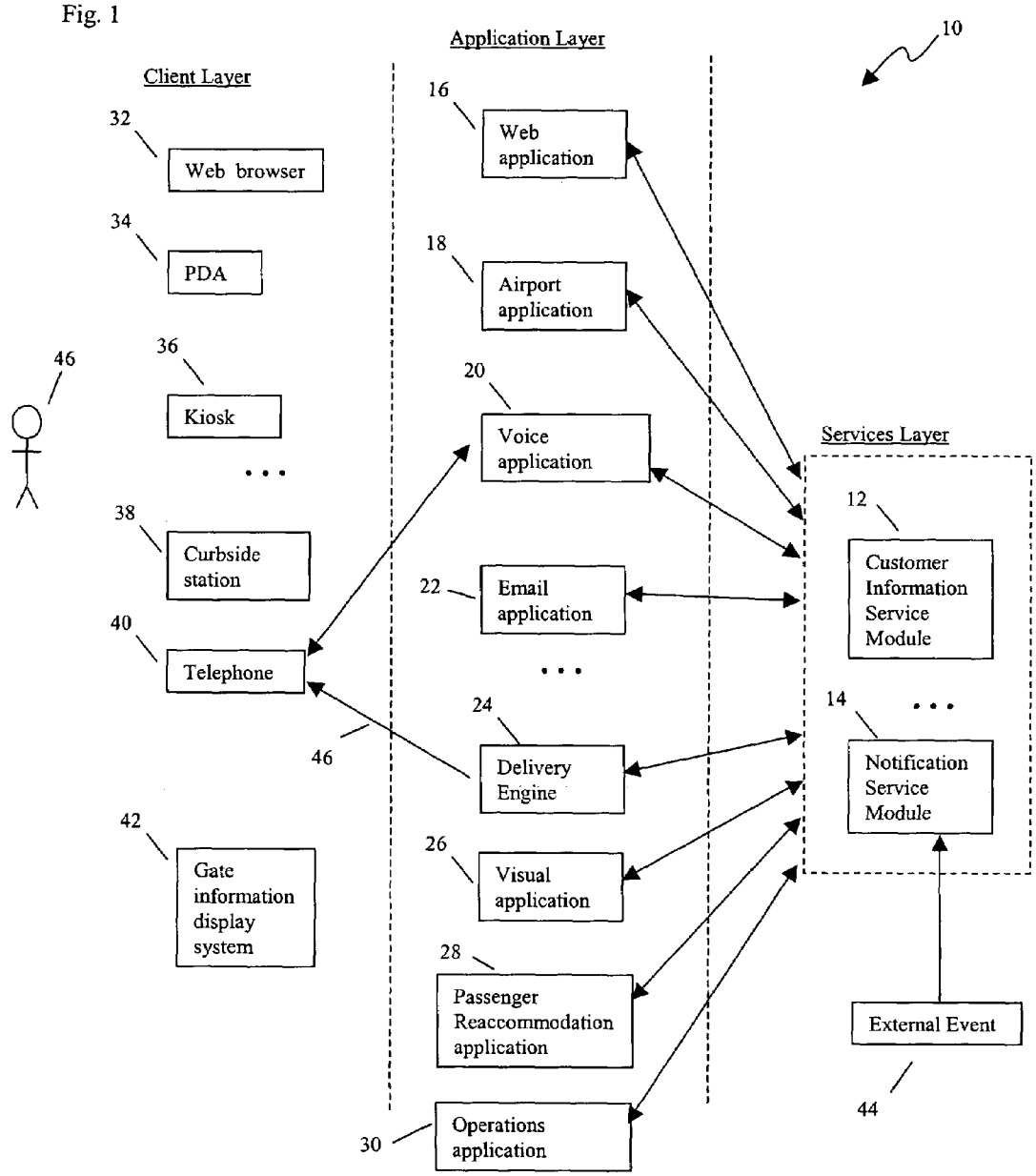
FIG. 1 is a schematic illustration of a system of one embodiment of the present invention.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Referring to FIG. 1, a system 10 of an embodiment of the present invention is illustrated. System 10 comprises a services layer that contains a set of components that offer functionality, as discussed in more detail below. The services layer is in communication with a series of modules in the application layer. The modules in the application layer expose the functionality of the modules in the service layer to one or more users 47 over one or more devices in the client layer.

For example purposes, a number of example services layer module 12, 14 are depicted, a number of application layer modules 16-30 are depicted, and a number of devices 32-42 are depicted. It is understood that numerous other modules and devices could be used in connection with the present invention.

Customer information service module 12 provides functionality so that information about customers can be accessed. Information about customers may include, for example, contact information, customer preferences, historical information, and reservation information.

Notification service module 14 informs application layer modules or other services layer modules of an event. In one embodiment, notification service module 14 determines the appropriate action to take or message to send upon the occurrence of an event. The notification service module 14 could use a rules engine to determine which messages to create based on the events that have occurred. In one embodiment, notification service module 14 receives an event from a module in the application layer. In another embodiment, notification service module 14 receives an external event 44.

Other services layer modules could include:

A reservation services module to provide functionality with respect to, for example, reservation booking, reservation cancellations, reservation modification, price quotes for reservations, and other reservation functionality.

A passenger services module to provide functionality with respect to, for example, flight check-in, bag check-in, ticket verification and other passenger service functionality.

A customer service module to provide functionality with respect to, for example, enrolling in a rewards program, enrolling for exclusive services and perks, and other customer service functionality.

A flight information service module to provide functionality with respect to, for example, gate information for a flight, flight arrival times, flight departure times, and other flight information functionality.

A ticketing service module to provide functionality with respect to, for example, issuing and reissuing tickets, and other ticketing functionality.

An authorization service module to provide functionality with respect to, for example, performing authorization checks to determine if a particular user can access certain functionality within the services layer or application layer and other authorization functionality.

Many modules in the services layer are also able to communicate with other modules in the services layer. Additionally, modules in the services layer may comprise certain functionality provided by third party services providers. In one embodiment, in which the present invention is used within the airline industry, certain modules of the services layer may be computer reservations systems functionality provided by third party providers, such as Sabre, Inc.

The modules in the application layer function to "expose" the functionality of services layer modules to the devices of the client layer. A single module in the application layer may communicate with multiple modules in the services layer. Some example modules in the application layer could include:

Web application 16 is a module that provides information and content via a network to a networked computing device. In one embodiment, web application 16 may expose the functionality of a reservation services module, a customer service module, and a flight information service module. In a further embodiment, web application 16 may be interactive with a recipient or an end-user via a web browser 32 or a personal digital assistant (PDA) 34.

Airport application 18 is a module that provides information and content to devices located at an airport, such as a kiosk or a curbside station. In one embodiment, airport application 18 may expose the functionality of a passenger services module and a ticketing service module.

Voice application 20 is a module that provides information and content to an audio device, such as telephone 40. In one embodiment, voice application 20 is an interactive voice response (IVR) system that may expose the functionality of a reservations module, a customer service module, and a flight information service module. A voice extensible markup language (VXML) may be used as the mechanism for communicating grammars in IVR applications.

Electronic messaging application 22 is a module that provides information and content via electronic messaging, such as email, SMS, and other messaging technologies. In one embodiment, electronic messaging application 22 may expose the functionality of the reservation services module, the flight information service module, and a ticketing service module.

Delivery engine 24 is a module for taking the message defined by the notification service module and delivering the message to the appropriate client device. The message, in addition to having the content, also initiates a transaction via another application so that the user can respond to the message. Delivery engine 24 determines the proper client device, formats the content, and sends the content to the device.

Delivery engine 24 is capable of initiating a connection with a device in the client layer. Once the connection is established, delivery engine 24 is capable of transferring the connection to a module in the application layer. For example, delivery engine 24 may initiate a voice connection 46 with telephone 40. Delivery engine would then deliver the content of the message via connection 46 to telephone 40. If user 47 of telephone 40 desires to communicate further, delivery engine transfers connection 46 to voice application 20.

In one embodiment, delivery engine 24 contains a connection module (not shown) that implements connection 46. The type of communication desired will dictate the type of connection 46 established. Some examples of connection modules include a telephone dialer, email server, internet server, voice XML server, or any device capable of establishing a connection.

Visual application 26 is a module that provides information and content via a display device, such as a television or a gate information display system. In one embodiment, visual application 26 may expose the functionality of the flight information service module and the reservation services module.

Passenger reaccommodation application 28 is a module that generates events about rebooking a reservation in the event a previous reservation is modified. There are many well-known methods of rebooking a reservation when a previous reservation is altered. In one embodiment, passenger reaccommodation application 28 provides information about modified reservations to notification service module 14.

Operations application 30 is a module that generates events about the operations of the system in which an embodiment of the present invention may be placed. For example, an embodiment of the present invention may be used in the airline industry, and the operations application 30 could handle the routing and cancellation of flights. In another embodiment, operations application 30 may communicate with notification service module 14. In a further embodiment, operations application 30 may communicate with a flight information service module.

Devices in the client layer can be any device capable of conveying a message. Devices can include computers, PDAs, mobile email devices, televisions, monitors, mobile phones, or any computing or other device capable of conveying a message to a user. Devices may generally be associated with a recipient 46.

Figure 2:
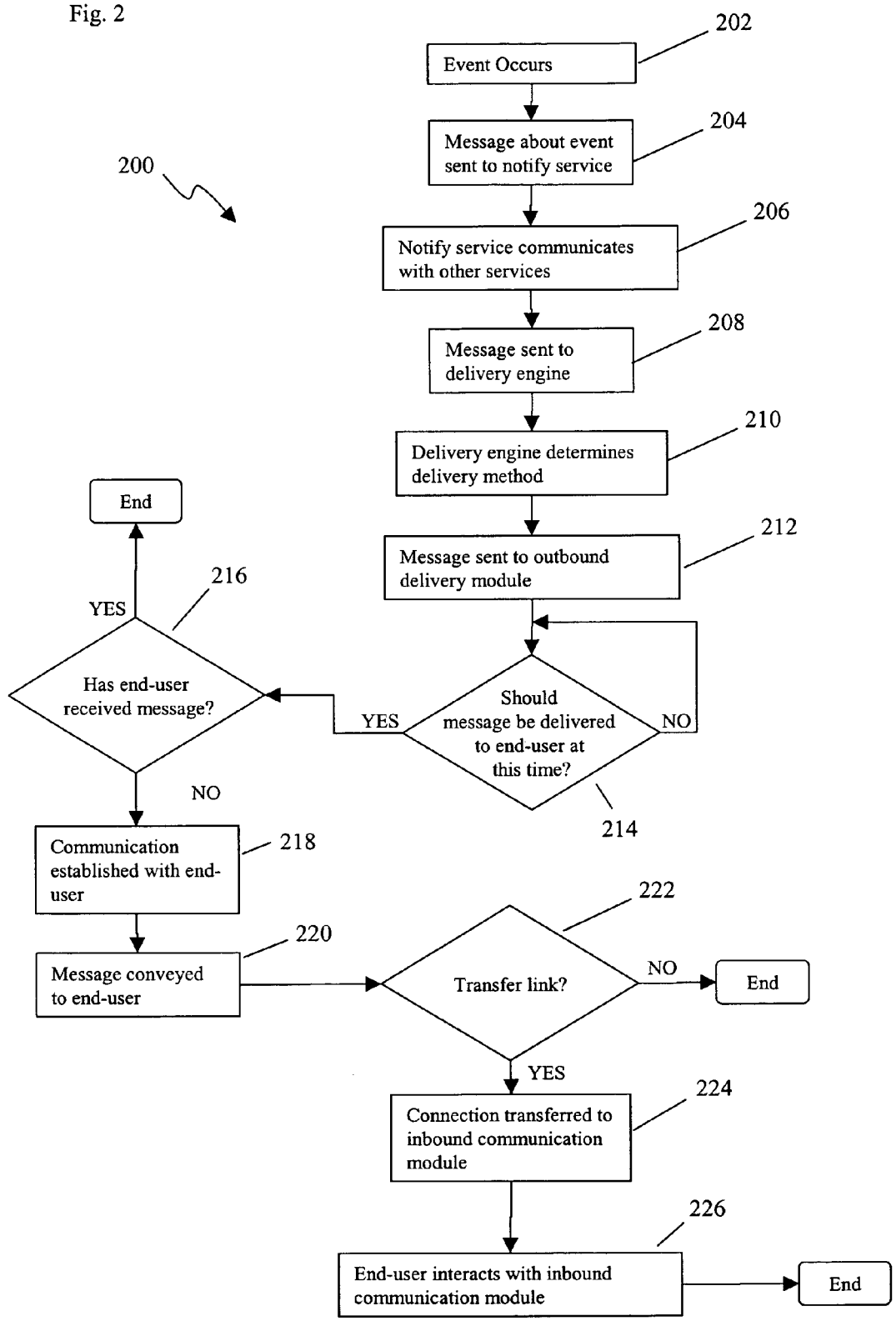
FIG. 2 is a flow diagram of the operation of one embodiment of the present invention.

Referring now to FIG. 2, an example diagram 200 of the operational flow of one embodiment of the present invention is shown. For example purposes, the operation of this embodiment will be discussed in the context of a passenger plane cancellation in the airline industry.

At step 202, an event occurs. Events can occur from an application, the services layer modules, or an external module, such as a customer reservation system. In the airline industry example, a passenger plane (e.g., flight number 1037) has its itinerary modified (for example, the flight is not able to fly its route due to inclement weather and is cancelled).

At step 204, the application module that is capable of responding to the particular type of event sends a message to the notification service module. The message can be sent using any form of communication technique, which could include such techniques as an extensible markup language, serialized Java objects, text-based methods, or other methods. Using the airline industry example, the passenger reaccommodation application has certain functionality that activates when a plane cancellation occurs. The passenger reaccommodation module detects that a passenger (e.g., Joe Smith) was on flight number 1037, which has now been cancelled. The passenger reaccommodation module analyzes available flights and places passenger Joe Smith on flight 282. The reaccommodation module then creates a message that passenger Joe Smith is now booked on flight 282, and sends the message to the notification service module.

At step 206, the notification service module receives the message about the event and, based on the message, may communicate with other service modules to retrieve additional information. In the airline industry example, the notification service module may communicate with a customer information service module to retrieve passenger Joe Smith's contact information and personal settings. In one embodiment, the personal settings may indicate passenger Joe Smith's preferred type (or types) of communication.

At step 208, the notification service module sends a notice to the delivery engine. In one embodiment, the notice comprises information about the message, contact information about the recipient, and communication preference. If there is no communication preference, then a default type of communication may be sent in the notice.

At step 210, the delivery engine determines the type of communication to be used to deliver the information about the message. In some instances, the method of communication provided by the notification service may not be desirable. In one embodiment, the delivery engine has business rules to determine whether the communication preference should be used or if an alternate form should be used based on the circumstances. For example, the communication preference may be "send via postal mail;" however, the message is time-sensitive and must be delivered within two hours. In such a circumstance, the delivery engine may determine a type of communication different from the original preference. Continuing the airline industry example, the delivery engine determines that the message is to be delivered by telephone.

At step 212, the delivery engine may send a command to an outbound delivery module. The outbound delivery module is the module that is capable of establishing a communication via the determined type of communication. The command that is sent to the outbound delivery module contains the communication parameters and the application to run once the connection is established. Continuing the airline industry example, the outbound delivery module to be used is a telephone dialer.

In one embodiment, the command sent by the delivery engine may be in XML form, and may contain the following information:

event_id: a unique identification that can be used to track events event_datetime: a timestamp when the event was generated event_type: a description of the type of event destination_type: the type of communication (e.g., phone, fax, sms, email, and others)

destination_address: the address of the end-user device (e.g., telephone number, fax number, sms number, email address, and others)
subject: the subject of the message
message_body: the message
script_name: script to be executed Additionally, certain types of events may have additional information. For example, in the airline industry, the command may also include:

airport_code: a code that refers to an airport
city_name: a city name that matches the airport_code
original_flight_number: flight number corresponding to the original flight the passenger was booked on
original_flight_origin_city: city name from which the original flight was departing
original_flight_origin_airport: the airport code for the airport of from which the original flight was to depart
original_flight_destination_city: city name to which the original flight was destined
original_flight_destination_airport: the airport code for the airport to which the original flight was to arrive
original_flight_date: the date the flight was scheduled to leave
original_flight_time: the time the flight was scheduled to leave
flight_status: the status of the flight (e.g., delayed, cancelled, rescheduled)
new_flight_number: flight number corresponding to the new flight the passenger is booked on
new_flight_origin_city: city name from which the new flight is departing
new_flight_origin_airport: the airport code for the airport of from which the new flight is to depart
new_flight_destination_city: city name to which the new flight is destined
new_flight destination_airport: the airport code for the airport to which the new flight is to arrive
new_flight_date: the date the flight is scheduled to leave
new_flight_time: the time the flight is scheduled to leave At step 214, the process determines whether the message should be delivered based on a series of business rules, which could include user preference rules and timing rules. If the message should be delivered, then the process proceeds to step 216. If the message should not be delivered at this time, then the process waits until the message should be delivered. For example, the message may not need to be delivered until a certain time or a particular event has happened.

At step 216, the process determines whether the intended recipient of the message has already received the message. For example, the recipient may have communicated via a web site or telephone and retrieved or been provided the message. Additionally, an event could be generated to cancel the delivery of the message by the recipient's preferred message (since the message has already been delivered).

At step 218, a communication link is established using a device. In the airline example, the telephone dialer places a telephone call to the telephone number associated with passenger Joe Smith.

At step 220, the outbound delivery module delivers the information about the message to a device associated with the recipient. In the airline industry example, the telephone dialer communicates to the telephone associated with Joe Smith that he is now booked on flight 282 such as by synthesizing speech.

At step 222, it is determined if the communication link should be transferred to a different application. In one embodiment, the communication link would be transferred upon request of the recipient of the information. In another embodiment, the communication link would be transferred in the event of an error conveying the information about the message. In the airline industry example, passenger Joe Smith is not able to fly on flight 282 and will need to reschedule. Since the communication link is by voice, Joe Smith may press a button on the telephone to indicate a desire to reschedule, or may respond by voice to the interactive voice component.

At step 224, the communication link is transferred to new application to enable communication between the recipient of the information and the new application. In the airline industry example, the communication link would be transferred to an interactive voice response system that is capable of interacting with Joe Smith, or the communication link could be transferred to an individual to handle the Joe Smith's requests.

In one embodiment, the transfer of the communication link can be performed by sending appropriate call variables over a TCP socket using known call-routing protocols. When the call variables are received, an integrated call manager finds an open telephone line and uses a toll free number for that line. The call can then be transferred to that number. The call and the information provided in the call variables arrive at the inbound communication module. In another embodiment, the inbound communication module can run scripts based on the values of the call variables. The script may lookup additional information from the services layer.

At step 226, the recipient of the information may interact with the new application (or human representative). In the airline industry example, Joe Smith may interact with the interactive voice response system to create a reservation on a different flight.

Figure 3:
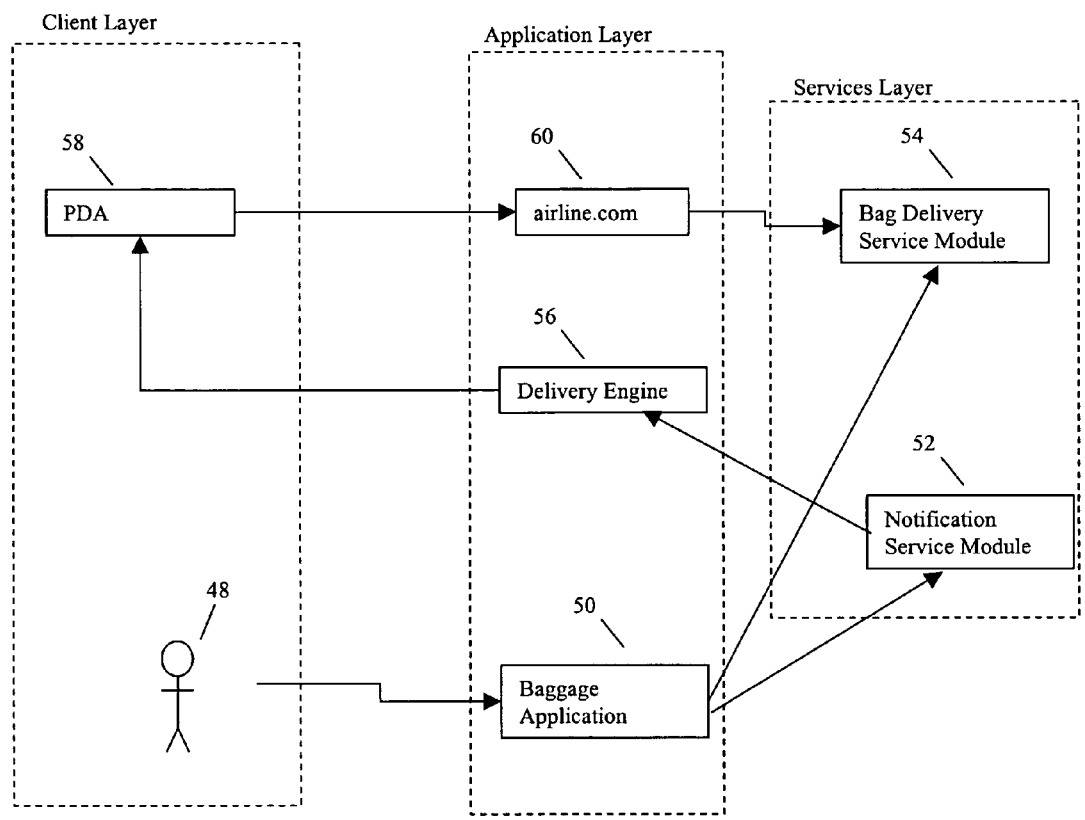
FIG. 3 is a schematic illustration of an embodiment of the present invention.

Referring now to FIG. 3, another embodiment of the present invention is shown for example purposes. In this example embodiment, the system is being used for notification of baggage that had been misplaced, but subsequently located, in the airline industry. Employee 48 has located the lost baggage and enters the information into the baggage application 50. Baggage application 50 has the functionality for tracking baggage. Baggage application 50 sends information to notification service module 52 and bag delivery service module 54 that the bag has been found (and other relevant information as provided by employee 48).

Notification service module 52 creates the message that the bag has been found and provides the message to delivery engine 56. The notification service module 52 may also communicate to delivery engine 56 that the recipient (in this example, the owner of the lost baggage) is to receive information via the recipient's PDA device. Delivery engine 56 establishes a communication link with the PDA, which in this instance, is by sending an email to PDA 58.

The recipient can use the PDA to review the information about the lost bag and can then request to schedule delivery of the bag. The communication link, which was an email, causes the PDA to then open a web browser and connect to the airline.com application module 60. The airline.com application module 60 is a web application that exposes the functionality of the bag delivery service module 54. In this instance, bag delivery service module 54 provides functionality for scheduling delivery of baggage to a location.

Figure 4:
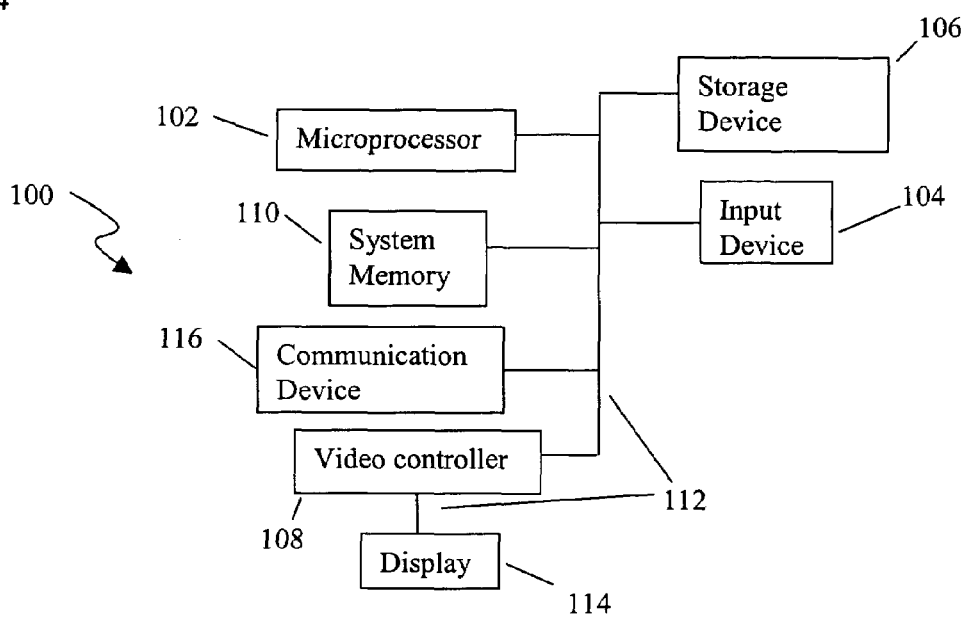
FIG. 4 is a schematic illustration of a system for implementing an embodiment of the present invention.

It will also be understood by those having skill in the art that one or more (including all) of the elements, steps, or modules of the present invention may be implemented using software executed on a general purpose computer system or networked computer systems, using special purpose hardware-based computer systems, or using combinations of special purpose hardware and software. Referring to FIG. 4, an illustrative node 100 for implementing an embodiment of the method is depicted. Node 100 includes a microprocessor 102, an input device 104, a storage device 106, a video controller 108, a system memory 110, and a display 114, and a communication device 116 all interconnected by one or more buses 112. The storage device 106 could be a floppy drive, hard drive, CD-ROM, optical drive, or any other form of storage device. In addition, the storage device 106 may be capable of receiving a floppy disk, CD-ROM, DVD-ROM, or any other form of computer-readable medium that may contain computer-executable instructions. Further communication device 116 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

In one embodiment, method for notifying a recipient of an event status change comprises detecting a status change in an event associated with a recipient, generating a message about the status change, identifying a communication type associated with the recipient, establishing a communication link, based on the communication type, between a first application and a device, providing information about the status change to the recipient, receiving a request from the recipient, and transferring the communication link such that the device and a second application are in communication.

In another embodiment, a method for notifying a recipient of an event status change comprises detecting a status change in an event, generating a message describing the status change, delivering the message from a first application via a first communication link having a first communication type, receiving an input from the recipient, and causing the recipient to be transferred to a second application that uses a second communication link having a second communication type.

In a further embodiment, a method for interactive notification comprises creating a message relating to an event applicable to a recipient, establishing a communication link between an outbound module and a device associated with the recipient, delivering the message to the device, receiving an input from the device at the outbound module, and transferring the communication link from the outbound module to an inbound module.

In yet another embodiment, a computer-readable medium comprises a series of instructions for use by at least one computer processor, wherein the instructions are for detecting a status change in an event associated with a recipient, generating a message about the status change, identifying a first communication type associated with the recipient, establishing a communication link between a first application and a device, wherein the communication link has the first communication type, providing information about the status change to the recipient, receiving a request from the recipient, and transferring the communication link such that the device and a second application are in communication.

The foregoing has outlined features of several embodiments according to aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. Method for notifying a recipient of an event status change, comprising:
   detecting a status change in an event associated with a recipient;
   generating a message about the status change;
   identifying a communication type associated with the recipient, the communication type being selected from the group consisting of:
      a communication established by a telephone dialer,
      a communication established by an email server,
      a communication established by an internet server, and
      a communication established by a voice XML server;
   establishing a communication link, based on the communication type, between a first application and a device;
   providing information about the status change to the recipient;
   receiving a request from the recipient; and
   transferring the communication link such that the device and a second application are in communication.

2. The method of claim 1, further comprising:
   generating a response to the status change.

3. The method of claim 2, wherein the providing information about the status change to the recipient further comprises:
   providing information about the response to the status change.

4. The method of claim 1, wherein the receiving a request from the recipient further comprises:
   receiving a request from the recipient before the communication link is ended.

5. The method of claim 1, wherein generating a message about the status change further comprises:
   generating an automated voice message about the status change.

6. The method of claim 1, wherein generating a message about the status change further comprises:
   generating an electronic message about the status change.

7. The method of claim 1, wherein the first application and the second application are different applications.

8. The method of claim 1, wherein the first application is a delivery engine.

9. The method of claim 1, wherein the second application is from a group consisting of a web application, an airport application, a voice application, and an email application.

10. The method of claim 1, wherein the device is a gate information display system.

11. A method for interactive notification, comprising:
    creating a message relating to an event applicable to a recipient, wherein the message is created by a notification service module;
    establishing a communication link between an outbound module and a device associated with the recipient;
    delivering the message to the device;
    receiving an input from the device at the outbound module; and
    transferring the communication link from the outbound module to an inbound module.

12. The method of claim 11, wherein the event is an itinerary of a flight is modified.

13. The method of claim 11, wherein the event is baggage is located.

14. An apparatus comprising:
    a computer-readable medium;
    a series of instructions stored on the computer-readable medium for use by at least one computer processor, the series of instructions comprising:
    instructions for detecting a status change in an event associated with a recipient;
    instructions for generating a message about the status change;
    instructions for identifying a first communication type associated with the recipient, the first communication type being selected from the group consisting of:
       a communication established by a telephone dialer,
       a communication established by an email server,
       a communication established by an internet server, and
       a communication established by a voice XML server;
    instructions for establishing a communication link between a first application and a device, wherein the communication link has the first communication type;
    instructions for providing information about the status change to the recipient;
    instructions for receiving a request from the recipient; and
    instructions for transferring the communication link such that the device and a second application are in communication.

* * * * *